(12) United States Patent
Wang (10) Patent No.: US 10,009,913 B2
(45) Date of Patent: Jun. 26, 2018

(54) INFORMATION SENDING METHOD AND APPARATUS (71) Applicant: HUAWEI DEVICE CO., LTD., Shenzhen (CN)

(72) Inventor: Jian Wang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 119 days.

(21) Appl. No.: 14/971,077

(22) Filed: Dec. 16, 2015

(65) Prior Publication Data
US 2016/0100419 A1 Apr. 7, 2016

Related U.S. Application Data (63) Continuation of application No. PCT/CN2014/082994, filed on Jul. 25, 2014.

(30) Foreign Application Priority Data

Aug. 2, 2013 (CN) .......................... 2013 1 0334826

(51) Int. Cl.
H04W 72/12 (2009.01)
H04W 72/04 (2009.01)
H04W 76/02 (2009.01)
H04W 76/14 (2018.01)

(52) U.S. Cl.
CPC ... *H04W 72/1226* (2013.01); *H04W 72/0446* (2013.01); *H04W 72/1231* (2013.01); *H04W 76/023* (2013.01); *H04W 76/14* (2018.02)

(58) Field of Classification Search
CPC .......... H04W 72/1226; H04W 76/023; H04W 72/0446; H04W 72/1231
See application file for complete search history.

(56) References Cited

U.S. PATENT DOCUMENTS

2009/0310592 A1 12/2009 Kessleman et al.
2011/0268004 A1* 11/2011 Doppler ............... H04W 72/02
370/311
(Continued)

FOREIGN PATENT DOCUMENTS

CN 102307060 A 1/2012
CN 102422703 A 4/2012
(Continued)

OTHER PUBLICATIONS

International Search Report dated Oct. 17, 2014, corresponding to International Application No. PCT/CN2014/082994.
(Continued)

*Primary Examiner* — Christine Ng
(74) *Attorney, Agent, or Firm* — Staas & Halsey LLP (57) ABSTRACT Embodiments of the present invention provide an information sending method and apparatus, where direct communication is performed between user devices in a first subframe, and channel state information of direct communication performed between the user devices is sent to a third device in a second subframe, so that the third device can learn the channel state information between the user devices, and further perform resource scheduling for the user devices performing direct communication.

12 Claims, 4 Drawing Sheets (56) References Cited

U.S. PATENT DOCUMENTS

| | | | |
|---|---|---|---|
| 2012/0020213 A1* | 1/2012 | Horneman | H04W 72/0406 370/231 |
| 2012/0182962 A1 | 7/2012 | Patil et al. | |
| 2012/0213183 A1 | 8/2012 | Chen et al. | |
| 2012/0243431 A1* | 9/2012 | Chen | H04W 72/0406 370/252 |
| 2013/0157660 A1* | 6/2013 | Awad | H04W 72/046 455/435.1 |
| 2013/0295976 A1* | 11/2013 | Patil | H04W 24/10 455/501 |
| 2014/0016574 A1* | 1/2014 | Seo | H04W 76/023 370/329 |
| 2014/0064203 A1 | 3/2014 | Seo et al. | |
| 2014/0128089 A1 | 5/2014 | Jang et al. | |
| 2014/0321423 A1* | 10/2014 | Kalhan | H04W 76/023 370/330 |
| 2014/0328226 A1 | 11/2014 | Pan et al. | |
| 2014/0348088 A1 | 11/2014 | Yu et al. | |
| 2017/0094561 A1 | 3/2017 | Horneman et al. | |

FOREIGN PATENT DOCUMENTS

| | | |
|---|---|---|
| CN | 102640553 A | 8/2012 |
| CN | 102792745 A | 11/2012 |
| CN | 103188742 A | 7/2013 |
| CN | 103209492 A | 7/2013 |
| CN | 103220782 A | 7/2013 |
| CN | 103404219 A | 11/2013 |
| WO | 2012/128505 A2 | 9/2012 |
| WO | 2012/160539 A1 | 11/2012 |
| WO | 2012/173443 A2 | 12/2012 |
| WO | WO 2012/166969 A1 | 12/2012 |
| WO | WO 2013/074463 A1 | 5/2013 |

OTHER PUBLICATIONS

International search Report dated Oct. 17, 2014 in corresponding International Application No. PCT/CN2014/082994.
"Change Request", 3GPP TSG-SA WG1 Meeting #61, Prague, CZ, S1-131307, Jan. 28-Feb. 1, 2013, pp. 1-4.
Extended European Search Report dated Apr. 21, 2016 in corresponding European Patent Application No. 14831664.9.
Korean Office Action dated Jun. 16, 2016 in corresponding Korean Patent Application No. 10-2015-7035791.
Japanese Office Action dated Dec. 6, 2016 in corresponding Japanese Patent Application No. 2016-520270.
Chinese Office Action dated May 27, 2017 in related Chinese Application No. 201310334826.7.
European Office Action dated May 17, 2017 in related European Office Action 14 831 664.9.
Chinese Office Action dated Dec. 5, 2017 in related Chinese Application No. 201310334826.7.

\* cited by examiner

FIG. 1

Resources used by a first user device and a second user device for performing communication Resources not used by the first user device and the second user device for performing communication

INFORMATION SENDING METHOD AND APPARATUS

CROSS-REFERENCE TO RELATED APPLICATIONS

This application is a continuation of International Application No. PCT/CN2014/082994, filed on Jul. 25, 2014, which claims priority to Chinese Patent Application No. 201310334826.7, filed on Aug. 2, 2013, both of which are hereby incorporated by reference in their entireties.

TECHNICAL FIELD

Embodiments of the present invention relate to the field of communications technologies, and in particular, to an information sending method and apparatus.

BACKGROUND

A Device to Device Proximity Service (Device to Device Proximity Service, D2D ProSe for short) has become a research subject of the Rel.12 system of a Long Term Evolution (Long Term Evolution, LTE) system in the 3rd generation partnership project (The 3rd Generation Partnership Project, 3GPP).

In the prior art, in a scenario in which a user device communicates with a base station, the user device measures quality of a channel, and then sends a measurement result to the base station. The base station sends a selected resource and modulation and coding level to the user device by using signaling. However, in a scenario in which user devices perform direct communication, because a base station does not participate in configuration and interaction processes of communication between user devices, the base station cannot learn quality of a channel between the user devices.

SUMMARY

Embodiments of the present invention provide an information sending method and apparatus, to implement resource scheduling for direct communication.

According to a first aspect, an embodiment of the present invention provides an information sending method, including:

performing, by a first user device, direct communication with a second user device in a first subframe;

sending, by the first user device, channel state information of direct communication performed between the first user device and the second user device to a third device in a second subframe; and receiving, by the first user device, resource scheduling information that is sent by the third device according to the channel state information.

With reference to the first aspect, in a first possible implementation manner of the first aspect, the first user device further sends communication state information of direct communication performed between the first user device and the second user device to the third device in the second subframe, where the communication state information is used to perform charging or release a link.

With reference to the first aspect or the first possible implementation manner, in a second possible implementation manner of the first aspect, the channel state information includes at least one of: channel state information of resources that have been allocated to the first user device and the second user device for performing direct communication, channel state information of resources that have not been allocated to the first user device and the second user device for performing direct communication, and channel state information of resources within a system bandwidth range.

With reference to the first aspect, the first possible implementation manner or the second possible implementation manner, in a third possible implementation manner of the first aspect, the communication state information of direct communication performed between the first user device and the second user device includes at least one of: communication data amount information of direct communication performed between the first user device and the second user device, and communication releasing information of direct communication performed between the first user device and the second user device.

With reference to the first aspect, the first possible implementation manner, the second possible implementation manner or the third possible implementation manner, in a fourth implementation manner of the first aspect, the channel state information of resources that have been allocated to the first user device and the second user device for performing direct communication includes:

a resource identifier of a resource that has been used and is in the resources that have been allocated to the first user device and the second user device for performing direct communication; or, a resource identifier of a resource that has not been used and is in the resources that have been allocated to the first user device and the second user device for performing direct communication;

the channel state information of resources that have not been allocated to the first user device and the second user device for performing direct communication includes: resource identifiers of some or all resources in the resources that have not been allocated to the first user device and the second user device for performing direct communication; and the channel state information of resources within a system bandwidth range includes: resource identifiers of some or all resources in the resources within the system bandwidth range.

With reference to the first aspect, the first possible implementation manner, the second possible implementation manner, the third possible implementation manner or the fourth possible implementation manner, in a fifth possible implementation manner of the first aspect, before the sending, by the first user device, channel state information of direct communication performed between the first user device and the second user device to a third device in a second subframe, the method further includes:

receiving, by the first user device, trigger signaling sent by the third device, where the trigger signaling is used to trigger the first user device to send at least one of the channel state information and the communication state information to the third device.

With reference to the first aspect, the first possible implementation manner, the second possible implementation manner, the third possible implementation manner, the fourth possible implementation manner or the fifth possible implementation manner, in a sixth possible implementation manner of the first aspect, each sending period includes the first subframe and the second subframe, and the performing, by a first user device, direct communication with a second user device in a first subframe includes:

performing, by the first user device, direct communication with the second user device in the first subframe of each sending period;

the sending, by the first user device, channel state information of direct communication performed between the first user device and the second user device to a third device in a second subframe includes:

sending, by the first user device, the channel state information of direct communication performed between the first user device and the second user device to the third device in the second subframe of at least one sending period; and the further sending, by the first user device, communication state information of direct communication performed between the first user device and the second user device to the third device in the second subframe includes:

further sending, by the first user device, the communication state information of direct communication performed between the first user device and the second user device to the third device in the second subframe of at least one sending period.

With reference to the first aspect, the first possible implementation manner, the second possible implementation manner, the third possible implementation manner, the fourth possible implementation manner, the fifth possible implementation manner or the sixth possible implementation manner, in a seventh possible implementation manner of the first aspect, a period in which the first user device sends the channel state information to the third device in the second subframe is less than a period in which the first user device sends the communication state information to the third device in the second subframe.

With reference to the first aspect, the first possible implementation manner, the second possible implementation manner, the third possible implementation manner, the fourth possible implementation manner, the fifth possible implementation manner, the sixth possible implementation manner or the seventh possible implementation manner, in an eighth possible implementation manner of the first aspect, the second subframe is a part of the first subframe; or, the second subframe does not overlap the first subframe.

According to a second aspect, an embodiment of the present invention provides an information sending method, including:

receiving, by a third device, channel state information that is sent by a first user device or a second user device in a second subframe and is of direct communication performed between the first user device and the second user device; and sending, by the third device, resource scheduling information to the first user device or the second user device according to the channel state information.

With reference to the second aspect, in a first possible implementation manner, the method further includes: receiving, by the third device, communication state information that is sent by the first user device or the second user device in the second subframe and is of direct communication performed between the first user device and the second user device; and performing charging or releasing a link, by the third device according to the communication state information.

With reference to the second aspect or the first possible implementation manner, in a second possible implementation manner of the second aspect, the channel state information of direct communication performed between the first user device and the second user device includes at least one of: channel state information of resources that have been allocated to the first user device and the second user device for performing direct communication, channel state information of resources that have not been allocated to the first user device and the second user device for performing direct communication, and channel state information of resources within a system bandwidth range.

With reference to the second aspect, the first possible implementation manner or the second possible implementation manner, in a third possible implementation manner of the second aspect, the communication state information of direct communication performed between the first user device and the second user device includes at least one of: communication data amount information of direct communication performed between the first user device and the second user device, and communication releasing information of direct communication performed between the first user device and the second user device.

With reference to the second aspect, the first possible implementation manner, the second possible implementation manner or the third possible implementation manner, in a fourth possible implementation manner of the second aspect, the channel state information of resources that have been allocated to the first user device and the second user device for performing direct communication includes:

a resource identifier of a resource that has been used and is in the resources that have been allocated to the first user device and the second user device for performing direct communication; or, a resource identifier of a resource that has not been used and is in the resources that have been allocated to the first user device and the second user device for performing direct communication;

the channel state information of resources that have not been allocated to the first user device and the second user device for performing direct communication includes: resource identifiers of some or all resources in the resources that have not been allocated to the first user device and the second user device for performing direct communication; and the channel state information of resources within a system bandwidth range includes: resource identifiers of some or all resources in the resources within the system bandwidth range.

With reference to the second aspect, the first possible implementation manner, the second possible implementation manner, the third possible implementation manner or the fourth possible implementation manner, in a fifth possible implementation manner of the second aspect, before the receiving, by a third device, channel state information that is sent by a first user device or a second user device in a second subframe and is of direct communication performed between the first user device and the second user device, the method further includes:

sending, by the third device, trigger signaling to the first user device or the second user device, where the trigger signaling is used to trigger the first user device or the second user device to send at least one of the channel state information and the communication state information to the third device.

With reference to the second aspect, the first possible implementation manner, the second possible implementation manner, the third possible implementation manner, the fourth possible implementation manner or the fifth possible implementation manner, in a sixth possible implementation manner of the second aspect, the receiving, by a third device, channel state information that is sent by a first user device or a second user device in a second subframe and is of direct communication performed between the first user device and the second user device includes:

receiving, by the third device, the channel state information that is sent by the first user device or the second user device in the second subframe of at least one sending period; and the receiving, by the third device, communication state information that is sent by the first user device or the second user device in the second subframe and is of direct communication performed between the first user device and the second user device includes:

receiving, by the third device, the communication state information that is sent by the first user device or the second user device in the second subframe of at least one sending period and is of direct communication performed between the first user device and the second user device.

With reference to first aspect, the first possible implementation manner, the second possible implementation manner, the third possible implementation manner, the fourth possible implementation manner, the fifth possible implementation manner or the sixth possible implementation manner, in a seventh possible implementation manner of the second aspect, the second subframe is a part of the first subframe; or, the second subframe does not overlap the first subframe.

According to a third aspect, an embodiment of the present invention provides a user device, where the user device includes:

a communications module, configured to perform direct communication with a second user device in a first subframe;

a sending module, configured to send channel state information of direct communication performed between the user device and the second user device to a third device in a second subframe; and a receiving module, configured to receive resource scheduling information that is sent by the third device according to the channel state information.

With reference to the third aspect, in a first possible implementation manner of the third aspect, the sending module is further configured to send communication state information of direct communication performed between the user device and the second user device to the third device in the second subframe, where the communication state information is used to perform charging or release a link.

With reference to the third aspect or the first possible implementation manner, in a second possible implementation manner of the third aspect, the channel state information of direct communication performed between the user device and the second user device includes at least one of: channel state information of resources that have been allocated to the user device and the second user device for performing direct communication, channel state information of resources that have not been allocated to the user device and the second user device for performing direct communication, and channel state information of resources within a system bandwidth range.

With reference to the third aspect, the first possible implementation manner or the second possible implementation manner, in a third possible implementation manner of the third aspect, the communication state information of direct communication performed between the user device and the second user device includes at least one of: communication data amount information of direct communication performed between the user device and the second user device, and communication releasing information of direct communication performed between the user device and the second user device.

With reference to the third aspect, the first possible implementation manner, the second possible implementation manner or the third possible implementation manner, in a fourth implementation manner of the third aspect, the channel state information of resources that have been allocated to the user device and the second user device for performing direct communication includes: a resource identifier of a resource that has been used and is in the resources that have been allocated to the user device and the second user device for performing direct communication; or a resource identifier of a resource that has not been used and is in the resources that have been allocated to the user device and the second user device for performing direct communication;

the channel state information of resources that have not been allocated to the user device and the second user device for performing direct communication includes: resource identifiers of some or all resources in the resources that have not been allocated to the user device and the second user device for performing direct communication; and the channel state information of resources within a system bandwidth range includes: resource identifiers of some or all resources in the resources within the system bandwidth range.

With reference to the third aspect, the first possible implementation manner, the second possible implementation manner, the third possible implementation manner or the fourth possible implementation manner, in a fifth possible implementation manner of the third aspect, the receiving module is further configured to receive trigger signaling sent by the third device, where the trigger signaling is used to trigger the user device to send at least one of the channel state information and the communication state information to the third device.

With reference to the third aspect, the first possible implementation manner, the second possible implementation manner, the third possible implementation manner, the fourth possible implementation manner or the fifth possible implementation manner, in a sixth possible implementation manner of the third aspect, each sending period includes the first subframe and the second subframe, and the communications module is specifically configured to perform direct communication with the second user device in the first subframe of each sending period;

the sending module is specifically configured to send the channel state information of direct communication performed between the user device and the second user device to the third device in the second subframe of at least one sending period; and the sending module is further specifically configured to send communication state information of direct communication performed between the user device and the second user device to the third device in the second subframe of at least one sending period.

With reference to the third aspect, the first possible implementation manner, the second possible implementation manner, the third possible implementation manner, the fourth possible implementation manner, the fifth possible implementation manner or the sixth possible implementation manner, in a seventh possible implementation manner of the third aspect, a period in which the sending module sends the channel state information to the third device in the second subframe is less than a period in which the sending module sends the communication state information to the third device in the second subframe.

With reference to the third aspect, the first possible implementation manner, the second possible implementation manner, the third possible implementation manner, the fourth possible implementation manner, the fifth possible implementation manner, the sixth possible implementation manner or the seventh possible implementation manner, in an eighth possible implementation manner of the third aspect, the second subframe is a part of the first subframe; or, the second subframe does not overlap the first subframe.

According to a fourth aspect, an embodiment of the present invention provides an information sending device in direct communication between user devices, including:

a receiving module, configured to receive channel state information that is sent by a first user device or a second user device in a second subframe and is of direct communication performed between the first user device and the second user device; and a processing module, configured to send resource scheduling information to the first user device or the second user device according to the channel state information.

With reference to the fourth aspect, in a first possible implementation manner of the fourth aspect, the receiving module is further configured to receive communication state information that is sent by the first user device or the second user device in the second subframe and is of direct communication performed between the first user device and the second user device; and the processing module is further configured to perform charging or release a link according to the communication state information.

With reference to the fourth aspect or the first possible implementation manner, in a second possible implementation manner of the fourth aspect, the channel state information of direct communication performed between the first user device and the second user device includes at least one of: channel state information of resources that have been allocated to the first user device and the second user device for performing direct communication, channel state information of resources that have not been allocated to the first user device and the second user device for performing direct communication, and channel state information of resources within a system bandwidth range.

With reference to the fourth aspect, the first possible implementation manner or the second possible implementation manner, in a third possible implementation manner of the fourth aspect, the communication state information of direct communication performed between the first user device and the second user device includes at least one of: communication data amount information of direct communication performed between the first user device and the second user device, and communication releasing information of direct communication performed between the first user device and the second user device.

With reference to the fourth aspect, the first possible implementation manner, the second possible implementation manner or the third possible implementation manner, in a fourth possible implementation manner of the fourth aspect, the channel state information of resources that have been allocated to the first user device and the second user device for performing direct communication includes:

a resource identifier of a resource that has been used and is in the resources that have been allocated to the first user device and the second user device for performing direct communication; or, a resource identifier of a resource that has not been used and is in the resources that have been allocated to the first user device and the second user device for performing direct communication;

the channel state information of resources that have not been allocated to the first user device and the second user device for performing direct communication includes:

resource identifiers of some or all resources in the resources that have not been allocated to the first user device and the second user device for performing direct communication; and the channel state information of resources within a system bandwidth range includes: resource identifiers of some or all resources in the resources within the system bandwidth range.

With reference to the fourth aspect, the first possible implementation manner, the second possible implementation manner, the third possible implementation manner or the fourth possible implementation manner, in a fifth possible implementation manner of the fourth aspect, the device further includes:

a sending module, configured to send trigger signaling to the first user device or the second user device, where the trigger signaling is used to trigger the first user device or the second user device to send at least one of the channel state information and the communication state information to the third device.

With reference to the fourth aspect, the first possible implementation manner, the second possible implementation manner, the third possible implementation manner, the fourth possible implementation manner or the fifth possible implementation manner, in sixth possible implementation manner of the fourth aspect, the receiving module is specifically configured to: receive the channel state information that is sent by the first user device or the second user device in the second subframe of at least one sending period; and receive the communication state information that is sent by the first user device or the second user device in the second subframe of at least one sending period and is of direct communication performed between the first user device and the second user device.

With reference to fourth aspect, the first possible implementation manner, the second possible implementation manner, the third possible implementation manner, the fourth possible implementation manner, the fifth possible implementation manner or the sixth possible implementation manner, in a seventh possible implementation manner of the fourth aspect, the second subframe is a part of the first subframe; or, the second subframe does not overlap the first subframe.

In the information sending method and apparatus provided in the embodiments of the present invention, direct communication is performed between user devices in a first subframe, and channel state information of direct communication performed between the user devices is sent to a third device in a second subframe, so that the third device can learn the channel state information between the user devices, and further perform resource scheduling for the user devices performing direct communication.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems.

A terminal in this application, that is, user equipment, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) in this specification may be a device that communicates with the user equipment on an air interface in an access network by using one or more sections. The base station may be configured to mutually convert a received over-the-air frame and an IP packet and serve as a router between the user equipment and a rest portion of the access network, where the rest portion of the access network may include an Internet protocol (IP) network. The base station may also coordinate attribute management of the air interface. For example, the base station may be a base station (BTS, Base Transceiver Station) in GSM or the CDMA, may also be a base station (NodeB) in WCDMA, and may further be an evolved NodeB (NodeB, eNB, or e-NodeB, evolved Node B) in the LTE, which is not limited in the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the symbol "/" in this specification generally indicates that associated objects before and after the symbol are in an or relationship.

Figure 1:
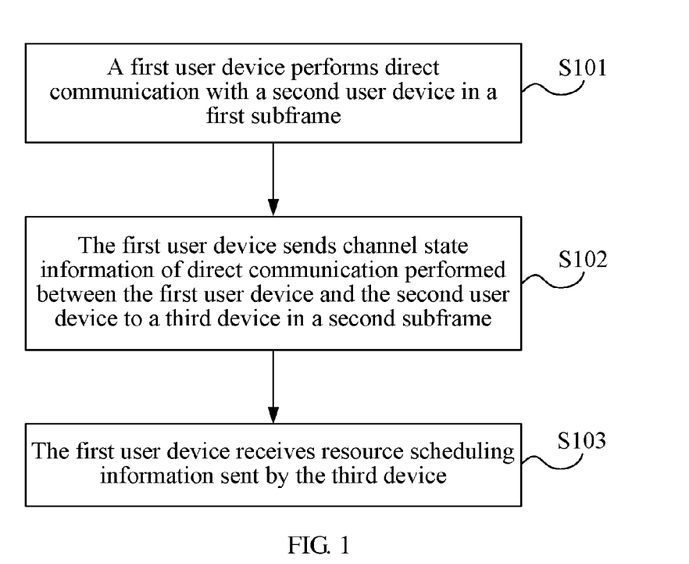
FIG. 1 is a flowchart of an embodiment of an information sending method according to the present invention.

FIG. 1 is a flowchart of an embodiment of an information sending method according to the present invention. As shown in FIG. 1, the method includes:

S101: A first user device performs direct communication with a second user device in a first subframe.

S102: The first user device sends channel state information of direct communication performed between the first user device and the second user device to a third device in a second subframe.

S103: The first user device receives resource scheduling information sent by the third device.

The resource scheduling information is used to perform resource scheduling for direct communication between the first user device and the second user device.

The first user device, the execution body of the foregoing steps of this embodiment, may be either user device in the two user devices performing direct communication.

Optionally, the first user device further sends communication state information of direct communication performed between the first user device and the second user device to the third device in the second subframe, so that the third device performs charging or releases a link according to the communication state information.

That is, either device of the two user devices performing direct communication may send the channel state information of direct communication performed between the first user device and the second user device to the third device, and may further report the communication state information to the third device.

The third device involved in this embodiment of the present invention may be a base station, may also be a user device, or may also be a device of another type except the first user device and the second user device.

Optionally, the first user device may periodically send the channel state information of direct communication performed between the first user device and the second user device to the third device, or may periodically send the communication state information of direct communication performed between the first user device and the second user device to the third device. Alternatively, a sending operation may also be performed after being triggered by the third device. The communication state information may include at least one of: communication data amount information of direct communication performed between the first user device and the second user device, and communication releasing information of direct communication performed between the first user device and the second user device.

It should be noted that, the first user device may send the channel state information to the third device in a state of exiting from direct communication, and similarly, may also send the communication state information to the third device in the state of exiting from direct communication. In this implementation scenario, the second subframe does not overlap the first subframe.

Alternatively, the first user device may send the channel state information to the third device in a state of not exiting from direct communication, and may also send the communication state information to the third device in the state of not exiting from the direct communication. In this implementation scenario, the second subframe is a part of the first subframe, that is, the user device not only performs direct communication in the second subframe, but also executes a sending operation in the second subframe.

The channel state information may include channel quality information (Channel quality information, CQI) of a channel related to direct communication performed between the first user device and the second user device. The communication state information may include at least one of the communication data amount information and the communication releasing information.

Optionally, the channel state information may include at least one of: channel state information of resources that have been allocated to the first user device and the second user device for performing direct communication, channel state information of resources that have not been allocated to the first user device and the second user device for performing direct communication, and channel state information of resources within a system bandwidth range.

The channel state information of the resources that have been allocated to the first user device and the second user device for performing direct communication includes a resource identifier, and specifically, may include: a resource identifier of a resource that has been used and is in the resources that have been allocated to the first user device and the second user device for performing direct communication; or, a resource identifier of a resource that has not been used and is in the resources that have been allocated to the first user device and the second user device for performing direct communication. Resources that have been used and resources that have not been used to perform direct communication by the first user device and the second user device within the system bandwidth range may be shown in FIG. 2.

Figure 2:
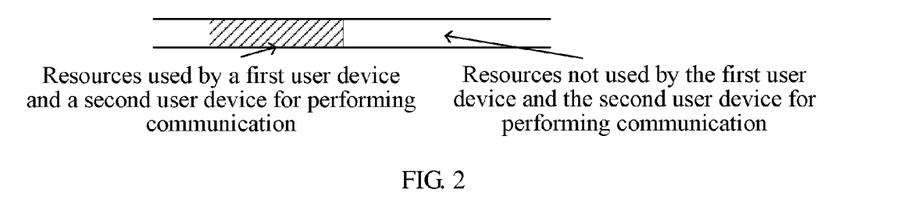
FIG. 2 is a schematic diagram of resources that have been used and resources that have not been used to perform direct communication by a first user device and a second user device within a system bandwidth range according to an embodiment of the present invention.

Similarly, the channel state information of the resources that have not been allocated to the first user device and the second user device for performing direct communication may also include a resource identifier, and specifically, may include: resource identifiers of some or all resources in the resources that have not been allocated to the first user device and the second user device for performing direct communication.

Similarly, the channel state information of the resources within the system bandwidth range may also include a resource identifier, and specifically, may include: resource identifiers of some or all resources in the resources within the system bandwidth range.

The channel state information may be used to indicate that channel quality of the resources that have been allocated to the user devices for performing direct communication is poor, and the resources may be released. The channel state information may also be used to indicate the resource that has been used and is in the resources that have been allocated to the user devices for performing direct communication, so that the remaining resources in the resources that have been allocated to the user devices for performing direct communication may be released. The channel state information may also be used to indicate a resource, which may be used for direct communication, in the resources that have not been allocated to the user device for performing direct communication.

The following uses a specific example for description. It is assumed that a system bandwidth is 20 MHz, and within the system bandwidth range, a quantity of available physical resource block pairs (Physical Resource Block Pair, PRB Pair) is 100. 20 PRB Pairs from a PRB Pair11# to a PRB Pair20# have been allocated to the first user device and the second user device for performing direct communication. Because a multipath effect of a channel causes selective fading of a channel frequency domain, channel quality information CQI in the 20 PRB Pairs that have been allocated to the user devices for performing direct communication may be different. For example, a modulation and coding Scheme (Modulation and Coding Scheme, MCS) level (level) from the PRB Pair11# to a PRB Pair15# is 12, and an MCS Level from a PRB Pair16# to the PRB Pair20# is 6. It is possible that channel quality of the PRB Pairs from the PRB Pair16# to the PRB Pair20# is poor, and the PRB Pairs cannot support normal data communication. In this implementation scenario, the first user device may send channel state information to the third device, where the channel state information includes resource identifiers of PRB Pairs from the PRB Pair16# to the PRB Pair20#, and is used to indicate that channel quality of the resources that have been allocated to the user device for performing direct communication is poor, and the resources may be released, and are not used for direct communication between the first user device and the second user device. In this implementation scenario, the first user device may also send channel state information to the third device, where the channel state information includes resource identifiers of PRB Pairs from the PRB Pair11# to the PRB Pair15#, and is used to indicate that in the resources (20 PRB Pairs from the PRB Pair11# to the PRB Pair20#) that have been allocated to the user devices for performing direct communication, only resources indicated by identifiers are used, and the remaining resources (resources from the PRB Pair16# to the PRB Pair20#) may be released, and are not used for direct communication between the first user device and the second user device. The channel state information may be sent to the third device by using a re-allocation (re-allocation) request of resources ('scheduled' resources).

For the 100 PRB Pairs within the system bandwidth range, 80 PRB Pairs except the 20 PRB Pairs from the PRB Pair11# to the PRB Pair20# are resources that have not been allocated. Because the first user device and the second user device do not perform direct communication on these resources, channel quality information (CQI) cannot be directly obtained. However, the first user device and the second user device may measure interference levels of these resources, uses a resource at a low interference level as an alternative resource for direct communication, and sends these resources to the third device, to indicate, to the third device, resources that currently have low interference levels, where these resources may be used as resources for direct communication. The channel state information may be sent to the third device by using an allocation suggestion (suggestion) of resources ('non-scheduled' resources).

The first user device may further send resources that are being used in the direct communication and resources that are suggested to be used to the third device. For example, in the specific example, 20 PRB Pairs from the PRB Pair11# to the PRB Pair20# have been allocated to the first user device and the second user device for performing direct communication, where resources used by the first user device and the second user device for performing direct communication are resources from the PRB Pair11# to the PRB Pair15#, and because interference levels of resources from a PRB Pair21# to a PRB Pair25# are small, the resources may be used by the first user device and the second user device for performing direct communication. Therefore, in this implementation scenario, the first user device may also send the channel state information to the third device, where the channel state information includes resource identifiers of PRB Pairs from the PRB Pair11# to the PRB Pair15# and resource identifiers of PRB Pairs from the PRB Pair21# to the PRB Pair25#, and is used to indicate that in the resources (20 PRB Pairs from the PRB Pair11# to the PRB Pair20#) that have been allocated to the user devices for performing direct communication, only resources from the PRB Pair11# to the PRB Pair15# are used, and the remaining resources (resources from the PRB Pair16# to the PRB Pair20#) may be released, and are not used for direct communication between the first user device and the second user device, and it is suggested to use the resources from the PRB Pair21# to the PRB Pair25# to perform direct communication between the first user device and the second user device.

After sending the channel state information of direct communication performed between the first user device and the second user device to the third device, the first user device receives the resource scheduling information sent by the third device. The resource scheduling information is used to perform resource scheduling for direct communication between the first user device and the second user device.

In the information sending method provided in this embodiment, direct communication is performed between user devices in a first subframe, and channel state information direct communication performed between the user devices is sent to a third device in a second subframe, so that the third device can learn the channel state information between the user devices, and further perform resource scheduling for the user devices performing direct communication.

Figure 3:
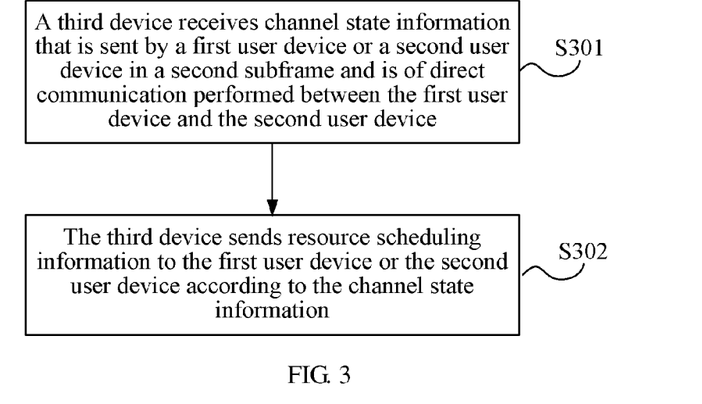
FIG. 3 is a flowchart of another embodiment of an information sending method according to the present invention.

FIG. 3 is a flowchart of another embodiment of an information sending method according to the present invention. As shown in FIG. 3, the method includes:

S301: A third device receives channel state information that is sent by a first user device or a second user device in a second subframe and is of direct communication performed between the first user device and the second user device.

S302: The third device sends resource scheduling information to the first user device or the second user device according to the channel state information.

The resource scheduling information is used to perform resource scheduling for direct communication between the first user device and the second user device.

The third device, the execution body of the foregoing device, may be a base station, may also be a user device, or may also be a device of another type except the first user device and the second user device.

Optionally, the third device may further receive communication state information that is sent by the first user device or the second user device in a second subframe and is of direct communication performed between the first user device and the second user device; and correspondingly, the third device may perform charging or release a link according to the communication state information.

Either device in the direct communication may send the channel state information to the third device, or may also send the communication state information to the third device. After the third device receives, in the second subframe, the channel state information sent by the first user device or the second user device, optionally, the third device may perform resource scheduling for the communication between the first user device and the second user device according to the channel state information; and after the third device receives the communication state information, the third device may also perform charging on the first user device and/or the second user device according to the communication state information.

For specific descriptions of the channel state information and the communication state information in this embodiment, reference may be made to related descriptions in the embodiments shown in FIG. 1 and FIG. 2, which are not described herein again. However, it should be noted that, the third device may execute corresponding subsequent operations according to received different channel state information.

For example, the channel state information that is sent by the first user device or the second user device and received by the third device includes: a resource identifier of a resource that has been used and is in the resources that have been allocated to the first user device and the second user device for performing direct communication, or, a resource identifier of a resource that has not been used and is in the resources that have been allocated to the first user device and the second user device for performing direct communication. The third device may learn resources that are being used by the first user device and the second user device for performing direct communication.

For another example, the channel state information sent by the first user device or the second user device and received by the third device includes: resource identifiers of some or all resources in the resources that have not been allocated to the first user device and the second user device for performing direct communication. The third device may learn resources that are being requested by the first user device and the second user device for performing direct communication.

For another example, the channel state information that is sent by the first user device or the second user device and received by the third device includes: resource identifiers of some or all resources in the resources within a system bandwidth range. The third device may compare a received physical identifier with a physical identifier that has been allocated to the direct communication. An overlapping part of the received physical identifier and the physical identifier of the direct communication is a resource that is being used in the direct communication, and a non-overlapping part is a resource newly requested by the direct communication.

In the information sending method provided in this embodiment, direct communication is performed between user devices in a first subframe, and a third device receives, in a second subframe, channel state information that is sent by a first user device or a second user device and is of direct communication performed between the user devices, so that the third device can learn the channel state information between the user devices, and further perform resource scheduling for the user devices performing direct communication.

On the basis of the embodiments shown in FIG. 1 to FIG. 3, in another embodiment of the information sending method, before receiving, in the second subframe, the channel state information that is sent by the first user device or the second user device and is of direct communication performed between the first user device and the second user device, the third device may trigger, in a trigger manner, the first user device or the second user device to send the channel state information.

Specifically, the third device may send trigger signaling to one or both of the first user device and the second user device, where the trigger signaling is used to trigger the first user device or the second user device to send the channel state information to the third device. Optionally, the trigger signaling may carry a device indication identifier, where the device indication identifier is used to instruct the first user device or the second user device to send the channel state information to the third device. That is, the third device may instruct, by using the identifier, either user device in the direct communication to send the channel state information of the direct communication.

It should be noted that, both of the two user devices in the direct communication may receive the trigger signaling sent by the third device, and by using the device indication identifier carried in the trigger signaling, the first user device may determine whether a device that is instructed to send the channel state information is the first user device itself and the second user device may determine whether the device that is instructed to send the channel state information is the second user device itself, and if the device that is instructed to send the channel state information is the first user device or the second user device, the user device executes a sending operation.

On the basis of the embodiments shown in FIG. 1 to FIG. 3, the first user device and/or the second user device may periodically send the channel state information of direct communication to the third device.

Optionally, each sending period may include the first subframe and the second subframe.

For either device in the direct communication, for example, the first user device, the first user device may perform direct communication with the second user device in the first subframe of each sending period; and the first user device may send the channel state information to the third device in the second subframe of at least one sending period.

That is, in addition to performing direct communication in the first subframe of each sending period, the first user device and the second user device may also execute a sending operation in the second subframe of each sending period. Alternatively, it may also be that, the first user device executes sending operations in second subframes of some sending periods, and the second user device executes sending operations in second subframes of the other sending periods.

Figure 4:
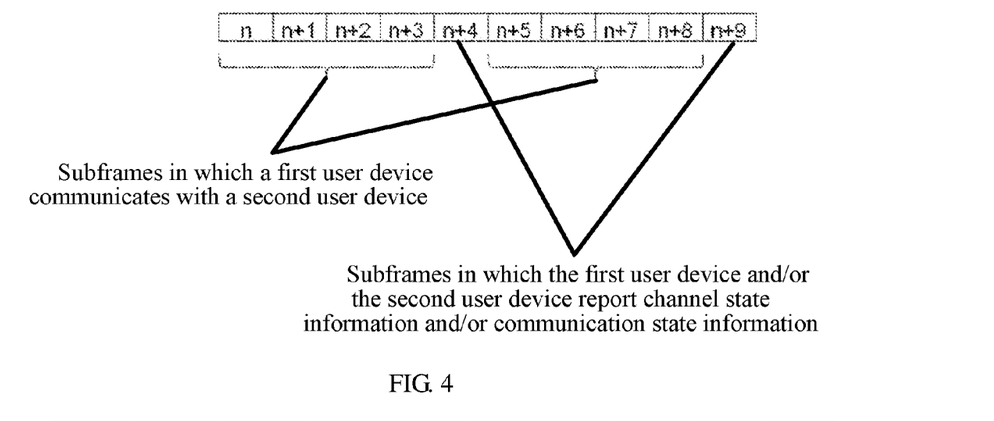
FIG. 4 is a first schematic diagram of a subframe used for direct communication according to an embodiment of the present invention.

The following uses a specific example for description. As shown in FIG. 4, the first user device may send at least one of the channel state information and the communication state information to the third device in a state of exiting from the direct communication. In this implementation scenario, the second subframe does not overlap the first subframe.

In FIG. 4, a subframe n to a subframe n+9 are subframes used by user devices to perform direct communication. Subframes n, n+1, n+2, n+3 are first subframes, and the first user device and the second user device perform inter-device data communication; a subframe n+4 is a second subframe, and in this subframe, the first user device and the second user device exit from a state of direct communication, and one of the first user device and the second user device sends the channel state information of direct communication to the third device. Similarly, a subframe n+5 to a subframe n+8 are first subframes, and the first user device and the second user device enter a state of direct communication herein, that is, the first user device and the second user device perform inter-device data communication; a subframe n+9 is a second subframe, the first user device and the second user device exit from the state of data communication, and one of the first user device and the second user device sends the channel state information related to the direct communication to the third device.

In this embodiment shown in FIG. 4, one sending subframe follows every 4 data communication subframes of direct communication closely. Alternatively, one of every 5 direct communication subframes is a sending subframe. In this implementation scenario, a sending period of the sending subframe of the direct communication is 5 ms.

Still using FIG. 4 as an example, the first user device may send the channel state information to the third device in a state of not exiting from direct communication. In this implementation scenario, the second subframe is a part of the first subframe, that is, the user device not only performs direct communication in the second subframe, but also executes a sending operation in the second subframe. A difference from the previous embodiment lies in that the first user device and the second user device perform inter-device data communication in all subframes. That is, when being in subframe n+4 and subframe n+9, the first user device and the second user device do not exit the state of direct communication, but send the communication state information related to the direct communication to the third device while performing direct communication, where the communication state information may include at least one of: communication data amount information of direct communication performed between the first user device and the second user device, and communication releasing information of direct communication performed between the first user device and the second user device.

In this implementation scenario, one in every 5 direct communication subframes is a sending subframe. Alternatively, a sending period of the sending subframe of the direct communication is 5 ms.

It should be noted that, in the foregoing two period sending manners, the sending subframe may also be dynamically triggered by the third device. Still using FIG. 4 as an example, the first user device and the second user device receive the trigger signaling of the third device in the subframe n, where the trigger signaling instructs the first user device or the second user device to send the channel state information of the direct communication. After the first user device or the second user device receives the trigger signaling, after a certain time delay, for example, after a delay of 3 subframes, the first user device or the second user device sends the channel state information in the subframe n+4.

Figure 5:
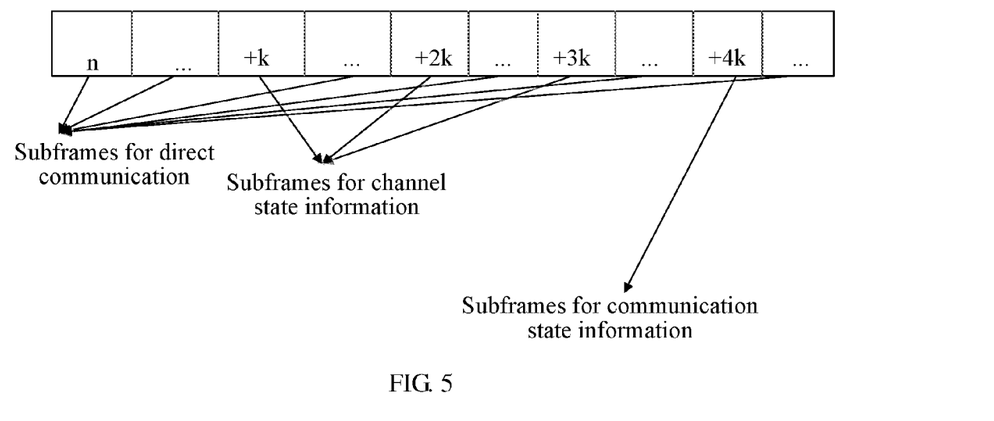
FIG. 5 is a second schematic diagram of a subframe used for direct communication according to an embodiment of the present invention.

On the basis of the foregoing embodiments, a period in which the first user device or the second user device sends the channel state information to the third device in the second subframe may be less than a period in which the first user device or the second user device sends the communication state information to the third device in the second subframe. As shown in FIG. 5, the direct communication includes a total of n+4k+1 subframes, which are from the subframe n to a subframe n+4k. A sending period in which the first user device or the second user device sends the channel state information to the third device is k, that is, there is one sending subframe in every k subframes. In this implementation scenario, sending periods of the channel state information and the communication state information may be different. The channel state information may be sent in subframes n+k, n+2k and n+4k, and the communication state information may be sent in the subframe n+4k.

It should be noted that, a method for sending the communication state information is similar to a manner of sending the channel state information of communication, and both may be sent by using the methods shown in FIG. 4 and FIG. 5, which are not described again herein.

Figure 6:
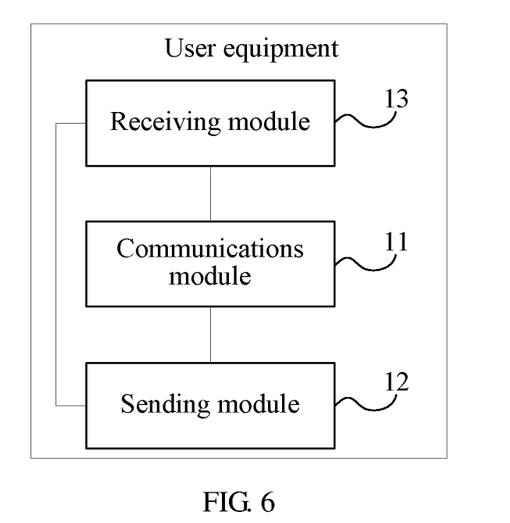
FIG. 6 is a schematic structural diagram of an embodiment of a user device according to the present invention.

FIG. 6 is a schematic structural diagram of an embodiment of a user device according to the present invention. As shown in FIG. 6, the user device includes:

a communications module 11, configured to perform direct communication with a second user device in a first subframe;

a sending module 12, configured to send channel state information of direct communication performed between the user device and the second user device to a third device in a second subframe; and a receiving module 13, configured to receive resource scheduling information that is sent by the third device according to the channel state information.

Optionally, the sending module 12 is further configured to further send communication state information of direct communication performed between the user device and the second user device to the third device in the second subframe, where the communication state information is used to perform charging or release a link.

Optionally, the channel state information of direct communication performed between the user device and the second user device includes at least one of: channel state information of resources that have been allocated to the user device and the second user device for performing direct communication, channel state information of resources that have not been allocated to the user device and the second user device for performing direct communication, and channel state information of resources within a system bandwidth range.

Optionally, the communication state information of direct communication performed between the user device and the second user device may include at least one of: communication data amount information of direct communication performed between the user device and the second user device, and communication releasing information of direct communication performed between the user device and the second user device.

Optionally, the channel state information of resources that have been allocated to the user device and the second user device for performing direct communication includes: a resource identifier of a resource that has been used and is in the resources that have been allocated to the user device and the second user device for performing direct communication; or a resource identifier of a resource that has not been used and is in the resources that have been allocated to the user device and the second user device for performing direct communication.

Optionally, the channel state information of resources that have not been allocated to the user device and the second user device for performing direct communication includes: resource identifiers of some or all resources in the resources that have not been allocated to the user device and the second user device for performing direct communication.

Optionally, the channel state information of resources within a system bandwidth range includes: resource identifiers of some or all resources in the resources within the system bandwidth range.

Optionally, the receiving module 13 is further configured to receive trigger signaling sent by the third device, where the trigger signaling is used to trigger the user device to send at least one of the channel state information and the communication state information to the third device.

Optionally, each sending period includes the first subframe and the second subframe, and the communications module 11 is specifically configured to perform direct communication with the second user device in the first subframe of each sending period.

The sending module 12 is specifically configured to send channel state information of direct communication performed between the user device and the second user device to the third device in the second subframe of at least one sending period; and the sending module is further specifically configured to send the communication state information of direct communication performed between the user device and the second user device to the third device in the second subframe of at least one sending period.

Optionally, a period in which the sending module 12 sends the channel state information to the third device in the second subframe is less than a period in which the sending module 12 sends the communication state information to the third device in the second subframe.

Optionally, the second subframe is a part of the first subframe; or, the second subframe does not overlap the first subframe.

It should be noted that, the user device provided in this embodiment is equivalent to the first user device in the foregoing method embodiment.

In the user device provided in this embodiment, channel state information of direct communication performed between user devices is sent to a third device in a second subframe, so that the third device can learn channel state information between the user devices, and further perform resource scheduling for the user devices performing direct communication.

Figure 7:
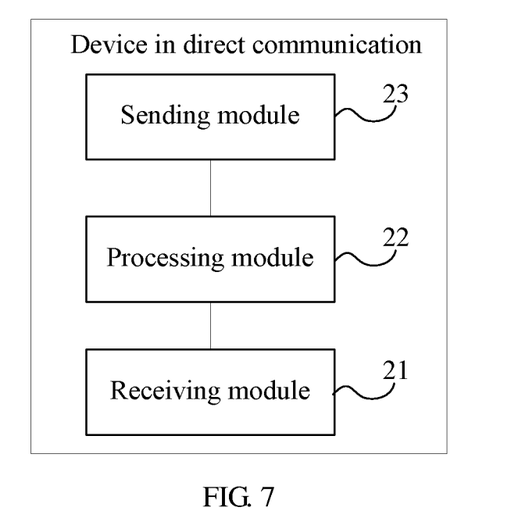
FIG. 7 is a schematic structural diagram of an embodiment of a device in direct communication according to the present invention.

FIG. 7 is a schematic structural diagram of an embodiment of a device in direct communication according to the present invention. As shown in FIG. 7, the device includes:

a receiving module 21, configured to receive channel state information that is sent by a first user device or a second user device in a second subframe and is of direct communication performed between the first user device and the second user device; and a processing module 22, configured to send resource scheduling information to the first user device or the second user device according to the channel state information, where the resource scheduling information is used to perform resource scheduling for direct communication that is performed between the first user device and the second user device in a first subframe.

Optionally, the receiving module 21 may further be configured to receive communication state information that is sent by the first user device or the second user device in the second subframe and is of direct communication performed between the first user device and the second user device.

The processing module 22 may further be configured to perform charging or release a link according to the communication state information.

The channel state information of direct communication performed between the first user device and the second user device includes at least one of: channel state information of resources that have been allocated to the first user device and the second user device for performing direct communication, channel state information of resources that have not been allocated to the first user device and the second user device for performing direct communication, and channel state information of resources within a system bandwidth range.

Optionally, the communication state information of direct communication performed between the first user device and the second user device may include at least one of: communication data amount information of direct communication performed between the first user device and the second user device, and communication releasing information of direct communication performed between the first user device and the second user device.

Optionally, the channel state information of resources that have been allocated to the first user device and the second user device for performing direct communication includes: a resource identifier of a resource that has been used and is in the resources that have been allocated to the first user device and the second user device for performing direct communication; or a resource identifier of a resource that has not been used and is in the resources that have been allocated to the first user device and the second user device for performing direct communication.

Optionally, the channel state information of the resources that have not been allocated to the first user device and the second user device for performing direct communication may include: resource identifiers of some or all resources in the resources that have not been allocated to the first user device and the second user device for performing direct communication.

Optionally, the channel state information of resources within a system bandwidth range may include: resource identifiers of some or all resources in the resources within the system bandwidth range.

Optionally, the device further may include:

a sending module 23, configured to send trigger signaling to the first user device or the second user device, where the trigger signaling is used to trigger the first user device or the second user device to send the channel state information to the third device.

Optionally, the receiving module 21 may be specifically configured to: receive channel state information that is sent by the first user device or the second user device in the second subframe of at least one sending period; and receive communication state information that is sent by the first user device or the second user device in the second subframe of at least one sending period and is of direct communication performed between the first user device and the second user device.

Optionally, the second subframe is a part of the first subframe; or, the second subframe does not overlap the first subframe.

In the device in direct communication provided in this embodiment, channel state information that is sent by a first user device or a second user device and is of direct communication performed between the user devices is received, so that the channel state information between the user devices can be learned, and further, resource scheduling is performed for the user devices performing direct communication.

Figure 8:
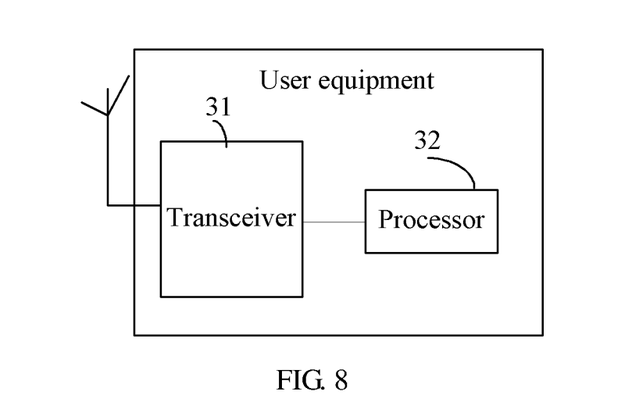
FIG. 8 is a schematic structural diagram of another embodiment of a user device according to the present invention.

FIG. 8 is a schematic structural diagram of another embodiment of a user device according to the present invention. As shown in FIG. 8, the user device includes a transceiver 31 and a processor 32.

The processor 32 is configured to perform direct communication with a second user device in a first subframe.

The transceiver 31 is configured to send channel state information of direct communication performed between the user device and the second user device to a third device in a second subframe.

The transceiver 31 is further configured to receive resource scheduling information that is sent by the third device according to the channel state information.

Optionally, the transceiver 31 may further be configured to send communication state information of direct communication performed between the user device and the second user device to the third device in the second subframe, where the communication state information is used to perform charging or release a link.

Optionally, the channel state information of direct communication performed between the user device and the second user device may include at least one of: channel state information of resources that have been allocated to the user device and the second user device for performing direct communication, channel state information of resources that have not been allocated to the user device and the second user device for performing direct communication, and channel state information of resources within a system bandwidth range.

Optionally, the communication state information of direct communication performed between the user device and the second user device may include at least one of: communication data amount information of direct communication performed between the user device and the second user device, and communication releasing information of direct communication performed between the user device and the second user device.

Optionally, the channel state information of resources that have been allocated to the user device and the second user device for performing direct communication includes: a resource identifier of a resource that has been used and is in the resources that have been allocated to the user device and the second user device for performing direct communication; or a resource identifier of a resource that has not been used and is in the resources that have been allocated to the user device and the second user device for performing direct communication.

Optionally, the channel state information of resources that have not been allocated to the first user device and the second user device for performing direct communication includes: resource identifiers of some or all resources in the resources that have not been allocated to the user device and the second user device for performing direct communication.

Optionally, the channel state information of resources within a system bandwidth range includes: resource identifiers of some or all resources in the resources within the system bandwidth range.

Optionally, the transceiver 31 is further configured to receive trigger signaling sent by a third device, where the trigger signaling is used to trigger the user device to send at least one of the channel state information and the communication state information to the third device.

Optionally, each sending period includes the first subframe and the second subframe, and the processor 32 is specifically configured to perform direct communication with the second user device in the first subframe of each sending period.

The transceiver 31 is specifically configured to send the channel state information of direct communication performed between the user device and the second user device to the third device in the second subframe of at least one sending period. The transceiver 31 is further specifically configured to send the communication state information of direct communication performed between the first user device and the second user device to the third device in the second subframe of at least one sending period.

Optionally, a period in which the transceiver 31 sends the channel state information to the third device in the second subframe is less than a period in which the transceiver 31 sends the communication state information to the third device in the second subframe.

Optionally, the second subframe is a part of the first subframe; or, the second subframe does not overlap the first subframe.

In the user device provided in this embodiment, channel state information of direct communication performed between user devices is sent to a third device in a second subframe, so that the third device can learn channel state information between the user devices, and further perform resource scheduling for the user devices performing direct communication.

Figure 9:
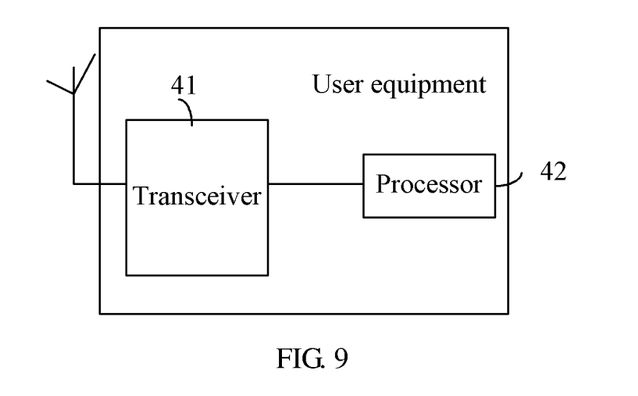
FIG. 9 is a schematic structural diagram of another embodiment of a device in direct communication according to the present invention.

FIG. 9 is a schematic structural diagram of still another embodiment of a device in direct communication according to the present invention. As shown in FIG. 9, the device includes a transceiver 41 and a processor 42.

The transceiver 41 is configured to receive channel state information that is sent by a first user device or a second user device in a second subframe and is of direct communication performed between the first user device and the second user device.

The processor 42 is configured to send resource scheduling information to the first user device or the second user device according to the channel state information.

The transceiver 41 is further configured to receive communication state information that is sent by the first user device or the second user device in the second subframe and is of direct communication performed between the first user device and the second user device.

The processor 42 is further configured to perform charging or release a link according to the communication state information.

Optionally, the channel state information of direct communication performed between the first user device and the second user device may include at least one of: channel state information of resources that have been allocated to the first user device and the second user device for performing direct communication, channel state information of resources that have not been allocated to the first user device and the second user device for performing direct communication, and channel state information of resources within a system bandwidth range.

Optionally, the communication state information of direct communication performed between the first user device and the second user device may include at least one of: communication data amount information of direct communication performed between the first user device and the second user device, and communication releasing information of direct communication performed between the first user device and the second user device.

Optionally, the channel state information of resources that have been allocated to the first user device and the second user device for performing direct communication includes: a resource identifier of a resource that has been used and is in the resources that have been allocated to the first user device and the second user device for performing direct communication; or a resource identifier of a resource that has not been used and is in the resources that have been allocated to the first user device and the second user device for performing direct communication.

Optionally, the channel state information of the resources that have not been allocated to the first user device and the second user device for performing direct communication may include: resource identifiers of some or all resources in the resources that have not been allocated to the first user device and the second user device for performing direct communication.

Optionally, the channel state information of resources within a system bandwidth range may include: resource identifiers of some or all resources in the resources within the system bandwidth range.

Optionally, the transceiver 41 is further configured to send trigger signaling to the first user device or the second user device, where the trigger signaling is used to trigger the first user device or the second user device to send the channel state information to the third device.

Optionally, the transceiver 41 may specifically be configured to receive channel state information that is sent by the first user device or the second user device in the second subframe of at least one sending period.

Optionally, the transceiver 41 may further be specifically configured to receive communication state information that is sent by the first user device or the second user device in the second subframe of at least one sending period and is of direct communication performed between the first user device and the second user device.

Optionally, the second subframe is a part of the first subframe; or, the second subframe does not overlap the first subframe.

In the device provided in this embodiment, channel state information that is sent by a first user device or a second user device and is of direct communication performed between the user devices is received, so that the channel state information between the user devices can be learned, and further, resource scheduling is performed for the user devices performing direct communication.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An information sending method, comprising:
   performing, by a first user device, direct communication with a second user device in a first subframe;
   sending, by the first user device, channel state information of direct communication performed between the first user device and the second user device to a third device in a second subframe;
   sending, by the first user device, communication state information of direct communication performed between the first user device and the second user device to the third device in the second subframe, the communication state information being used to perform charging; and
   receiving, by the first user device, resource scheduling information that is sent by the third device according to the channel state information,
   wherein each sending period of a plurality of sending periods comprises the first subframe and the second subframe, and the performing, by a first user device, direct communication with a second user device in a first subframe comprises:
      performing, by the first user device, direct communication with the second user device in the first subframe of each sending period;
   the sending, by the first user device, channel state information of direct communication performed between the first user device and the second user device to a third device in a second subframe comprises:
      sending, by the first user device, the channel state information of direct communication performed between the first user device and the second user device to the third device in the second subframe of at least one sending period; and
   the further sending, by the first user device, communication state information of direct communication performed between the first user device and the second user device to the third device in the second subframe comprises:
      further sending, by the first user device, the communication state information of direct communication performed between the first user device and the second user device to the third device in the second subframe of at least one sending period,
   wherein a period in which the first user device sends the channel state information to the third device in the second subframe is less than a period in which the first user device sends the communication state information to the third device in the second subframe.

2. The method according to claim 1, wherein the channel state information of direct communication performed between the first user device and the second user device comprises at least one of: channel state information of resources that have been allocated to the first user device and the second user device for performing direct communication, channel state information of resources that have not been allocated to the first user device and the second user device for performing direct communication, or channel state information of resources within a system bandwidth range.

3. The method according to claim 2, wherein the channel state information of resources that have been allocated to the first user device and the second user device for performing direct communication comprises:
   a resource identifier of a resource that has been used and is in the resources that have been allocated to the first user device and the second user device for performing direct communication; or,
   a resource identifier of a resource that has not been used and is in the resources that have been allocated to the first user device and the second user device for performing direct communication;
the channel state information of resources that have not been allocated to the first user device and the second user device for performing direct communication comprises: resource identifiers of some or all resources in the resources that have not been allocated to the first user device and the second user device for performing direct communication; and
the channel state information of resources within a system bandwidth range comprises: resource identifiers of some or all resources in the resources within the system bandwidth range.

4. The method according to claim 1, wherein the communication state information of direct communication performed between the first user device and the second user device comprises at least one of: communication data amount information of direct communication performed between the first user device and the second user device, and communication releasing information of direct communication performed between the first user device and the second user device.

5. The method according to claim 1, wherein before the sending, by the first user device, channel state information of direct communication performed between the first user device and the second user device to a third device in a second subframe, the method further comprises:
receiving, by the first user device, trigger signaling sent by the third device, wherein the trigger signaling is used to trigger the first user device to send at least one of the channel state information and the communication state information to the third device.

6. The method according to claim 1, wherein the second subframe is a part of the first subframe; or, the second subframe does not overlap the first subframe.

7. A user device, comprising:
a memory; and
at least one processor, coupled to the memory, configured to:
perform direct communication with a second user device in a first subframe;
send channel state information of direct communication performed between the user device and the second user device to a third device in a second subframe and send communication state information of direct communication performed between the user device and the second user device to the third device in the second subframe, the communication state information being used to perform charging; and
receive resource scheduling information that is sent by the third device according to the channel state information,
wherein each sending period of a plurality of sending periods comprises the first subframe and the second subframe, and the at least one processor is further configured to:
perform direct communication with the second user device in the first subframe of each sending period;
send the channel state information of direct communication performed between the user device and the second user device to the third device in the second subframe of at least one sending period; and
send the communication state information of direct communication performed between the user device and the second user device to the third device in the second subframe of at least one sending period,
wherein a period in which the channel state information is sent to the third device in the second subframe is less than a period in which the communication state information is sent to the third device in the second subframe.

8. The user device according to claim 7, wherein the channel state information of direct communication performed between the user device and the second user device comprises at least one of: channel state information of resources that have been allocated to the user device and the second user device for performing direct communication, channel state information of resources that have not been allocated to the user device and the second user device for performing direct communication, or channel state information of resources within a system bandwidth range.

9. The user device according to claim 8, wherein the channel state information of resources that have been allocated to the user device and the second user device for performing direct communication comprises: a resource identifier of a resource that has been used and is in the resources that have been allocated to the user device and the second user device for performing direct communication; or,
a resource identifier of a resource that has not been used and is in the resources that have been allocated to the user device and the second user device for performing direct communication;
the channel state information of resources that have not been allocated to the user device and the second user device for performing direct communication comprises: resource identifiers of some or all resources in the resources that have not been allocated to the user device and the second user device for performing direct communication; and
the channel state information of resources within a system bandwidth range comprises: resource identifiers of some or all resources in the resources within the system bandwidth range.

10. The user device according to claim 7, wherein the communication state information of direct communication performed between the user device and the second user device comprises at least one of: communication data amount information of direct communication performed between the user device and the second user device, and communication releasing information of direct communication performed between the user device and the second user device.

11. The user device according to claim 7, wherein the processor is further configured to receive trigger signaling sent by the third device, wherein the trigger signaling is used to trigger the user device to send at least one of the channel state information and the communication state information to the third device.

12. The user device according to claim 7, wherein the second subframe is a part of the first subframe; or, the second subframe does not overlap the first subframe.

\* \* \* \* \*